US012781861B2

(12) United States Patent
Watson

(10) Patent No.: US 12,781,861 B2

(45) Date of Patent: Nov. 3, 2026

(54) DIRECTIONAL CONTROL VALVE

(71) Applicant: Dallas Chism Watson, Guthrie, OK (US)

(72) Inventor: Dallas Chism Watson, Guthrie, OK (US)

( * ) Notice: Subject to any disclaimer, the term of this patent is extended or adjusted under 35 U.S.C. 154(b) by 0 days.

(21) Appl. No.: 18/809,598

(22) Filed: Aug. 20, 2024

(65) Prior Publication Data

US 2026/0055818 A1 Feb. 26, 2026

(51) Int. Cl.
*F16K 11/07* (2006.01)
*F16K 27/04* (2006.01)
*F16K 31/122* (2006.01)

(52) U.S. Cl.
CPC ........ *F16K 11/0712* (2013.01); *F16K 27/041* (2013.01); *F16K 31/1225* (2013.01)

(58) Field of Classification Search
CPC .... F16K 11/07; F16K 11/0712; F16K 27/041; F16K 31/122; F16K 31/1225
See application file for complete search history.

(56) References Cited

U.S. PATENT DOCUMENTS 4,369,805 A * 1/1983 Tavor .................. G05D 11/008 137/99
4,889,153 A * 12/1989 Zepernick .............. F16K 11/07 137/625.69
2001/0047832 A1* 12/2001 Hedlund ............ F15B 13/0402 137/625.66
2017/0167617 A1* 6/2017 Layne ................. F16K 31/0613
2021/0262599 A1* 8/2021 Hatano ................... F16L 41/03
2022/0298933 A1* 9/2022 Burke ................... F01L 1/3442
2022/0333709 A1* 10/2022 Nishimura ............ F16K 27/041
2024/0209955 A1* 6/2024 Hatano ................. F16K 31/426
2025/0050702 A1* 2/2025 Galluzzi ............. B60G 17/056
2025/0109755 A1* 4/2025 Coretto ............... F15B 13/0402

FOREIGN PATENT DOCUMENTS

IT 202100031739 A1 * 6/2023 ............. F15B 15/18

* cited by examiner

*Primary Examiner* — Kelsey E Cary
(74) *Attorney, Agent, or Firm* — Hall Estill Law Firm

(57) ABSTRACT

A directional control valve wherein the valve includes a body having radial directed ports disposed therein. The valve also includes a sleeve disposed in the body, the sleeve having radial directed ports disposed therein in general alignment with the ports in the body. The valve further includes a spool slidably disposed within the sleeve to direct a high pressure operational fluid and a discharge fluid to the desired ports in the sleeve and body. A method that includes the step of directing a high pressure operational fluid to a desired location via a directional control valve. The method also includes the step of redirecting the high pressure operational fluid to a second desired location via the directional control valve. The method further includes the step of directing an exhaust fluid, via the directional control valve, to a desired location.

17 Claims, 5 Drawing Sheets

DIRECTIONAL CONTROL VALVE

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE DISCLOSURE

1. Field of the Invention

The present disclosure generally relates to a directional control valve that can handle higher operating pressures.

2. Description of the Related Art

Directional control valves are used to direct fluids (gases or liquids) to pressure cylinders to operate the pressure cylinders in multiple directions. Typically, these directional control valves are used for fluids at lower pressures. In light of certain current operational situations there is access to high pressure fluids that can be used with directional control valves The problem is the current designs for the directional control valve cannot handle the higher pressure fluids without multiple issues, such as fluid leaks.

Accordingly, there is a need for a directional control valve that can be used with the high pressure fluids.

SUMMARY OF THE DISCLOSURE

The present disclosure is directed to a directional control valve wherein the valve includes a body having radial directed ports disposed therein. The valve also includes a sleeve disposed in the body, the sleeve having radial directed ports disposed therein in general alignment with the ports in the body. The valve further includes a spool slidably disposed within the sleeve to direct a high pressure operational fluid and a discharge fluid to the desired ports in the sleeve and body.

The present disclosure is also directed to a method that includes the step of directing a high pressure operational fluid to a desired location via a directional control valve. The method also includes the step of redirecting the high pressure operational fluid to a second desired location via the directional control valve. The method further includes the step of directing an exhaust fluid, via the directional control valve, to a desired location.

DETAILED DESCRIPTION OF THE DISCLOSURE

Figure 1A:
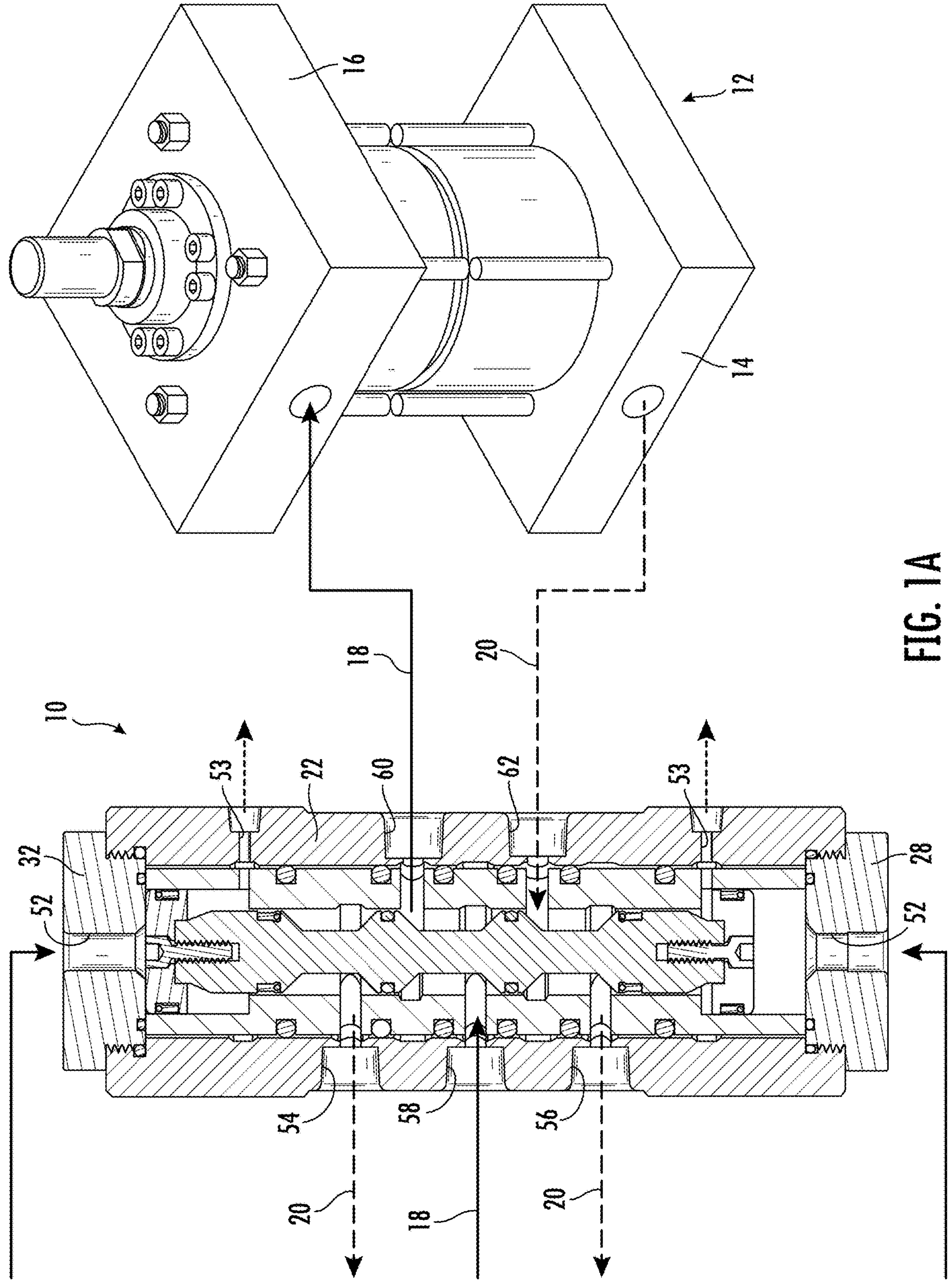
FIG. 1A is a cross-sectional view of a directional control valve in a first position and constructed in accordance with the present disclosure in use with a pressure cylinder shown in a perspective view.
Figure 1B:
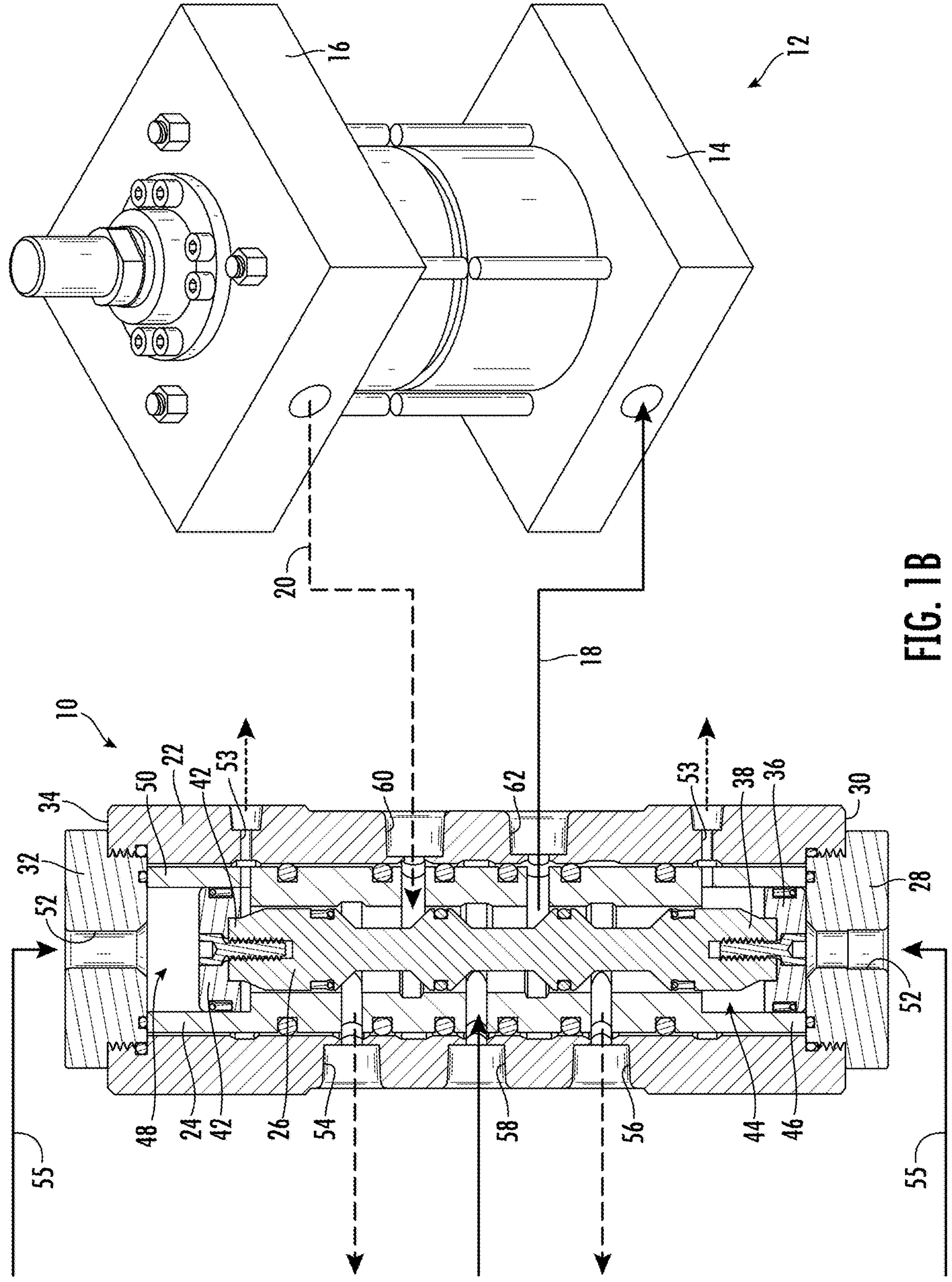
FIG. 1B is a cross-sectional view of the directional control valve in a second position and constructed in accordance with the present disclosure in use with the pressure cylinder shown in a perspective view.

The present disclosure is related to a directional control valve 10 that can be used to direct high pressure fluids (liquids or gases) to multiple places on a device that can use the high pressure fluids. The present disclosure is also directed to a method of directing the flow of fluids to operate various devices using the directional control valve 10. For example, the directional control valve 10 can be used to direct high pressure fluids to a pressure cylinder 12 shown in FIGS. 1A and 1B. As shown in FIG. 1A, the directional control valve 10 can direct the high pressure fluid 18 to a first side 14 of the pressure cylinder 12 when the directional control valve 10 is in a first position. Conversely, as shown in FIG. 1B, the directional control valve 10 can direct the high pressure fluid 18 to a second side 16 of the pressure cylinder 12. The directional control valve 10 can switch the high pressure fluid 18 between the first and second sides 14 and 16 of the pressure cylinder 12 to operate the pressure cylinder 12 for its intended purpose. As the directional control valve 10 directs the high pressure fluid 18 back and forth to operate the pressure cylinder 12, a discharge fluid 20 is generated on the side of the pressure cylinder 12 opposite from the side the high pressure fluid 18 is directed to. The discharge fluid 20 is forced back towards the directional control valve 10 from the pressure cylinder 12 and through the directional control valve 10. The directional control valve 10 can then direct the discharge fluid 20 to any desired location for any desired purpose. Similar to the high pressure fluids, the discharge fluid can be a gas or liquid.

Figure 2:
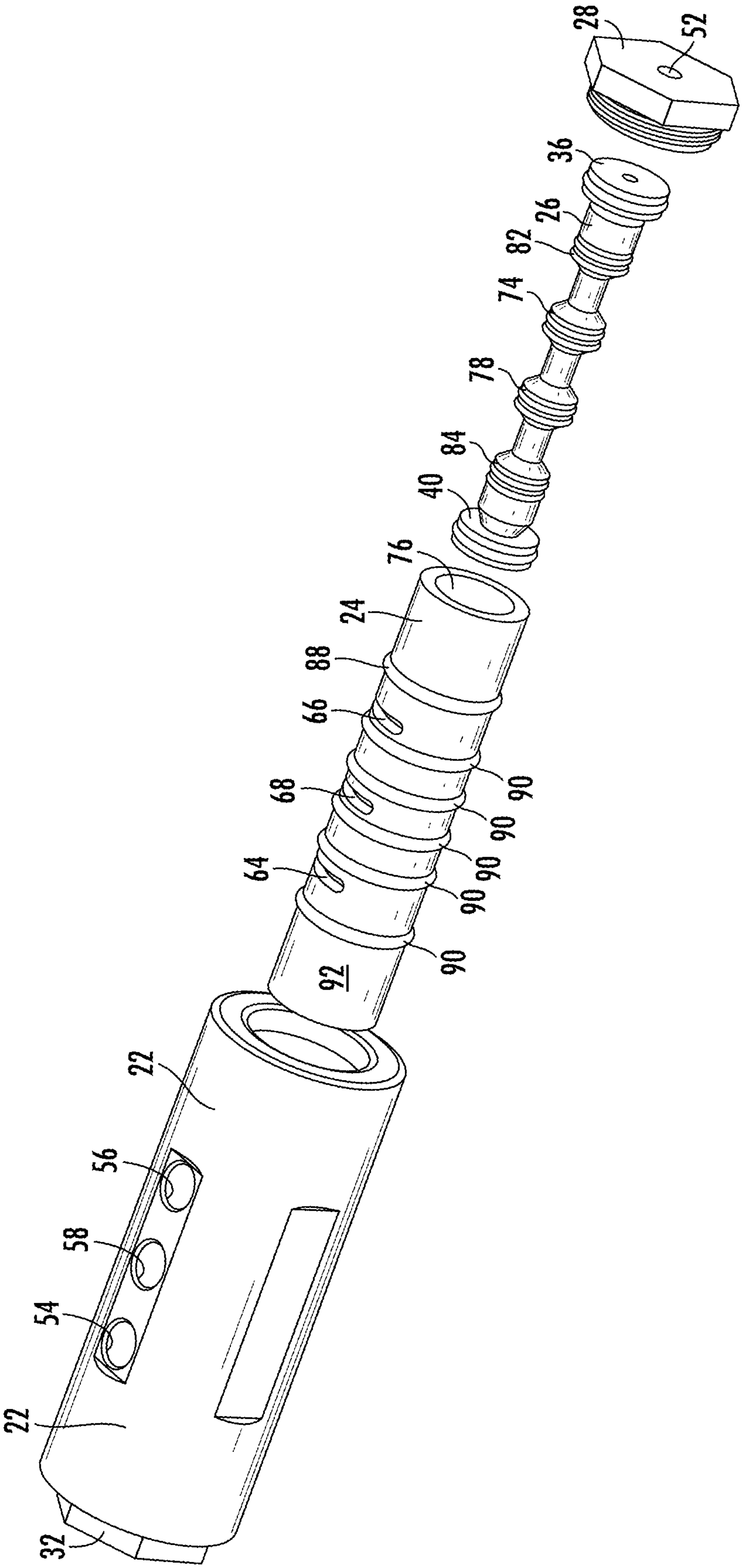
FIG. 2 is an exploded view of the directional control valve constructed in accordance with the present disclosure.
Figure 3A:
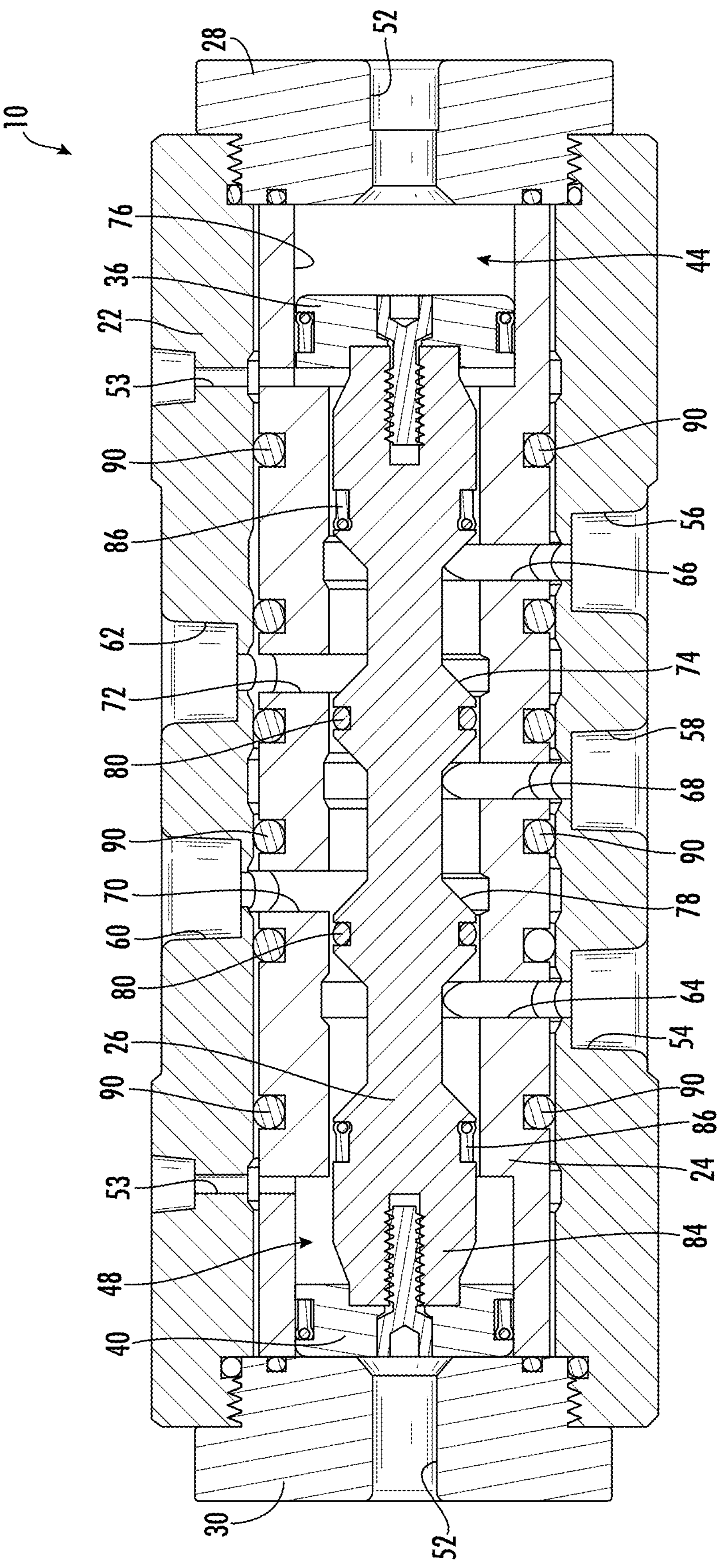
FIG. 3A is a cross-sectional view of the directional control valve in the first position and constructed in accordance with the present disclosure.
Figure 3B:
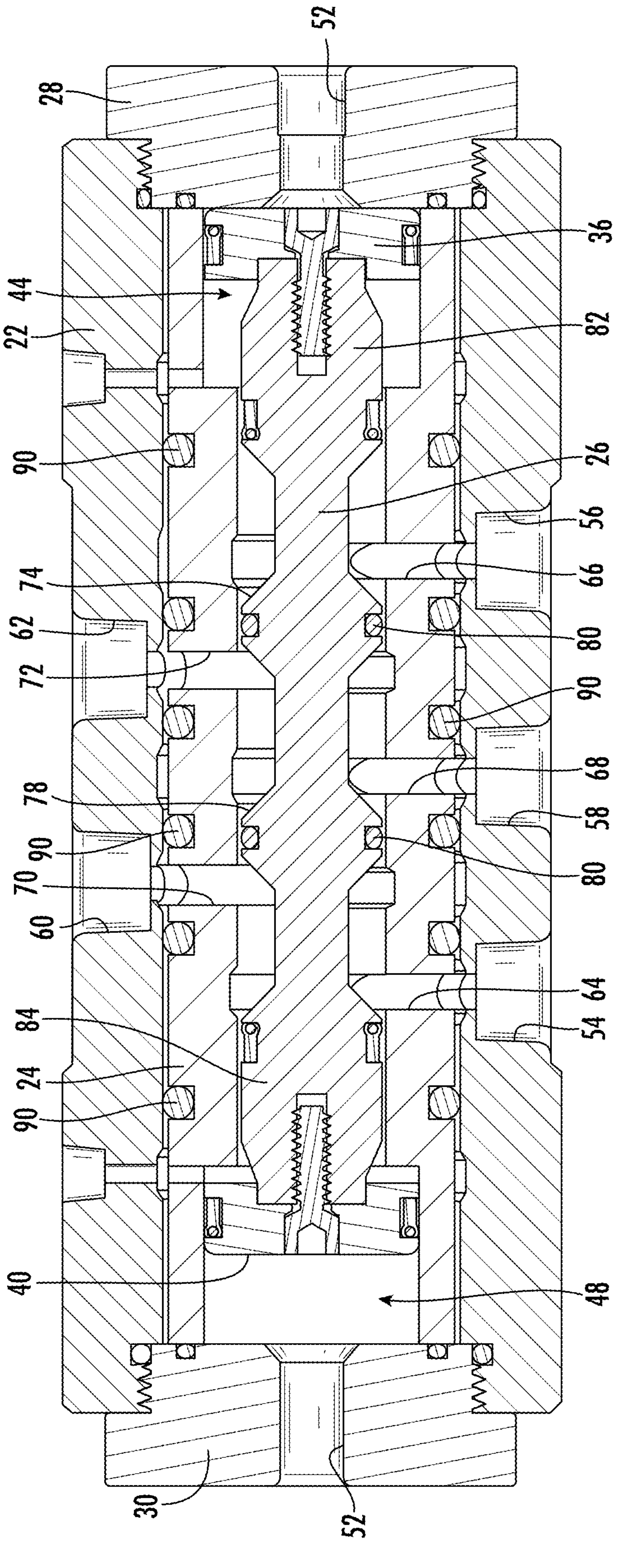
FIG. 3B is a cross-sectional view of the directional control valve in the second position and constructed in accordance with the present disclosure.

Referring now to FIGS. 2-3B, the directional control valve 10 includes a body 22, a sleeve 24 removably disposed within the body 22 and a spool 26 slidably disposed within the sleeve 24. The directional control valve 10 can include a first end cap 28 securable on a first end 30 of the body 22 of the directional control valve 10 and a second end cap 32 securable on a second end 34 of the body 22 of the directional control valve 10. The spool 26 can have a first piston head 36 securely disposed on a first end 38 of the spool 26 and a second piston head 40 securely disposed on a second end 42 of the spool 26. The first piston 36 can be slidable within a first cavity area 44 disposed within a first end 46 of the sleeve 24. Similarly, the second piston 40 can be slidable withing a second cavity area 48 disposed within a second end 50 of the sleeve 24. The first and second end caps 28 and 32 can have ports 52 disposed there to permit some operational fluid, such as instrument air 55, to engage the first and second piston heads 36 and 40 to move the spool 26 back and forth in the sleeve 24. The directional control valve 10 can also include vents 53 in the sleeve 24 and body 22 that fluidically connect the first and second cavity areas 44 and 48 to outside of the directional control valve 10.

The body 22 can have a first discharge port 54 and a second discharge port 56 for providing a place where the discharge fluid 20 can exit the directional control valve 10. The body 22 can also include an inlet port 58 for receiving the high pressure fluid 18 to be directed to the pressure cylinder 12, or some other device needing a reciprocating supply of high pressure fluid. Further the body 22 can include a first operational port 60 to direct the high pressure fluid to the pressure cylinder 12 or receive the discharge fluid 20 depending upon what position the spool 26 is in the sleeve 24. The body 22 can further include a second operational port 62 to receive the discharge fluid 20 from the pressure cylinder 12 or to direct the high pressure fluid to the pressure cylinder depending upon the position of the spool 26 inside the sleeve 24.

The sleeve 24 includes a first discharge port 64 and a second discharge port 66 for providing a place where the discharge fluid 20 can exit the directional control valve 10. The sleeve 24 can also include an inlet port 68 for receiving the high pressure fluid 18 to be directed to the pressure cylinder 12, or some other device needing a reciprocating supply of high pressure fluid. Further the sleeve 24 can include a first operational port 700 to direct the high pressure fluid to the pressure cylinder 12 or receive the discharge fluid 20 depending upon what position the spool 26 is in the sleeve 24. The sleeve 24 can further include a second operational port 72 to receive the discharge fluid 20 from the pressure cylinder 12 or to direct the high pressure fluid to the pressure cylinder depending upon the position of the spool 26 inside the sleeve 24.

The inlet port 58 of the body 22 is disposed between the first and second discharge ports 54 and 56 in an axial direction. Similarly, the inlet port 68 of the sleeve 24 is disposed between the first and second discharge ports 64 and 66 in an axial direction. In and axial direction along the directional control valve 10, the first operational ports 60 and 70 of the body 22 and sleeve 24, respectively, are positioned between the first discharge ports 54 and 64 and the first inlet port 58 of the body 22 and the first inlet port 68 of the sleeve 24, respectively. Furthermore, in an axial direction along the directional control valve 10, the second operational port 62 of the body 22 is positioned between the inlet port 58 and the second discharge port 56 of the body 22. Similarly, the second operational port 72 of the sleeve 24 is positioned between the inlet port 68 and the second discharge port 66 of the sleeve 24 in an axial direction. The first and second discharge ports 64 and 66, the inlet port 68, the first operational port 70 and the second operational port 72 of the sleeve 24 all correspond to the first and second discharge ports 54 and 56, the inlet port 58, the first operational port 60 and the second operational port 62 of the body 22, respectively.

The spool 26 can have a first bulbous portion 74 that engages an inner side 76 of the sleeve 24 to isolate the first cavity area 44 from the first discharge port 64 in the sleeve 24 and a second bulbous portion 78 that engages the inner side 76 of the sleeve 24 to isolate the second cavity area 48 from the second discharge port 66 in the sleeve 24. The directional control valve 10 can include seal elements 80 disposed at least partially within the first and second bulbous portions 74 and 78 of the spool 26 to contribute to the fluidic isolation. The spool 26 can also include a third bulbous portion 82 and a fourth bulbous portion 84 to engage with the inner side 76 of the sleeve 24 and to isolate certain ports in the spool from other ports depending upon whether the spool 26 is in the first or second position in the sleeve 24. The third and fourth bulbous portions 82 and 84 can have seal members 86 disposed therein to contribute to the fluidic isolation of the ports in the sleeve 24.

The directional control valve 10 can also include seal elements 88 disposed on the first end 46 of the sleeve 24 to engage with an inner side 90 of the first end cap 28 and on the second end 50 of the sleeve 24 to engage with an inner side 92 of the second end cap 32. The directional control valve 10 can also include seal elements 90 disposed on an outer side 92 of the sleeve 24 in a radial direction to prevent fluid flowing through the directional control valve 10 from leaking. In one embodiment, the directional control valve 10 can include at least one seal element 90 between the first discharge port 64 and the inlet port 68 in an axial direction and between the inlet port 68 and the second discharge port 66 in an axial direction. The directional control valve 10 can also include at least one seal element 90 between the first and second operational ports 70 and 72 in an axial direction. In a further embodiment, the directional control valve 10 can include at least two seal elements 90 between the first discharge port 64 and the inlet port 68 in an axial direction and between the inlet port 68 and the second discharge port 66 in an axial direction. The directional control valve 10 can also include at least two seal elements 90 between the first and second operational ports 70 and 72 in an axial direction. The seal elements/members 80, 86, 88 and 90 can be o-rings.

The sleeve 24 can be constructed of a non-metallic material. In one embodiment, the sleeve 24 can be made of a polytetrafluoroethylene (PTFE) containing material. In yet another embodiment, the sleeve 24 can be made entirely out of PTFE. The directional control valve 10 is designed to operate with fluids at pressures that exceed 150 pounds per square inch (psi). In another embodiment, the directional control valve 10 is designed to operate with fluids at a pressure greater than about 175 psi. In a further embodiment, the directional control valve 10 is designed to operate with fluids at a pressure greater than about 250 psi. In yet another embodiment, the directional control valve 10 is designed to operate with fluids at a pressure greater than about 400 psi. In an even further embodiment of the present disclosure, the directional control valve 10 is designed to operate with fluids at a pressure greater than about 750 psi. In yet another embodiment, the directional control valve 10 is designed to operate with fluids at a pressure greater than about 1000 psi.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A directional control valve, the valve comprising:

a single, cylindrically shaped body having radial directed ports disposed therein, the radial directed ports in the body disposed in opposing radial halves of the body;

a sleeve disposed in the body, the sleeve having radial directed ports disposed therein in general alignment with the ports in the body, the radial directed ports in the sleeve disposed in opposing radial halves of the sleeve;

a spool slidably disposed within the sleeve to direct a high pressure operational fluid and a discharge fluid to the desired ports in the sleeve and body;

a first end cap securable to a first end of the body of the directional control valve;

a second end cap securable to a second end of the body of the directional control valve;

a first seal disposed between the first end cap and a first end of the sleeve; and a second seal disposed between the second end cap and a second end of the sleeve; and wherein the directional control valve directs an exhaust fluid to a desired location.

2. The valve of claim 1 further comprising:

a first discharge port disposed in the body and a second discharge port disposed in the sleeve in general alignment with the first discharge port;

a first inlet port disposed in the body and a second inlet port disposed in the sleeve in general alignment with the first inlet port;

a first operational port disposed in the body and a second operational port disposed in the sleeve in general alignment with the first operational port of the body; and a third operational port disposed in the body and a fourth operational port disposed in the sleeve in general alignment with the third operational port of the body.

3. The valve of claim 2 further comprising a third discharge port disposed in the body and a fourth discharge port disposed in the sleeve in general alignment with the third discharge port in the body.

4. The valve of claim 2 further comprising seal elements disposed between the sleeve and the body in a radial direction to fluidically seal the first discharge port from the first inlet port and to fluidically seal the first operational port from the third operational port.

5. The valve of claim 1 wherein the spool includes multiple bulbous portions that engage with the sleeve to direct the flow of the operational fluid and the discharge fluid to the desired ports in the sleeve and body.

6. The valve of claim 1 wherein the valve is designed to handle operational fluid with a pressure greater than about 150 psi.

7. The valve of claim 6 wherein the valve is designed to handle operational fluid with a pressure greater than about 175 psi.

8. The valve of claim 1 wherein the sleeve is made of a non-metallic material.

9. The valve of claim 1 wherein the sleeve is made of a polytetrafluoroethylene (PTFE) containing material.

10. A method, the method comprising:

directing a high pressure operational fluid to a desired location via a directional control valve, the directional control valve comprising:

a single, cylindrically shaped body having radial directed ports disposed therein, the radial directed ports in the body disposed in opposing radial halves of the body;

a sleeve disposed in the body, the sleeve having radial directed ports disposed therein in general alignment with the ports in the body, the radial directed ports in the sleeve disposed in opposing radial halves of the sleeve;

a spool slidably disposed within the sleeve to direct a high pressure operational fluid and a discharge fluid to the desired ports in the sleeve and body; and a first end cap securable to a first end of the body of the directional control valve;

a second end cap securable to a second end of the body of the directional control valve;

a first seal disposed between the first end cap and a first end of the sleeve; and a second seal disposed between the second end cap and a second end of the sleeve;

redirecting the high pressure operational fluid to a second desired location via the directional control valve; and directing an exhaust fluid, via the directional control valve, to a desired location.

11. The method of claim 10 wherein the directional control valve further comprises:

a first discharge port disposed in the body and a second discharge port disposed in the sleeve in general alignment with the first discharge port;

a first inlet port disposed in the body and a second inlet port disposed in the sleeve in general alignment with the first inlet port;

a first operational port disposed in the body and a second operational port disposed in the sleeve in general alignment with the first operational port of the body; and a third operational port disposed in the body and a fourth operational port disposed in the sleeve in general alignment with the third operational port of the body.

12. The method of claim 11 further comprising a third discharge port disposed in the body and a fourth discharge port disposed in the sleeve in general alignment with the third discharge port in the body.

13. The method of claim 10 wherein the spool includes multiple bulbous portions that engage with the sleeve to direct the flow of the operational fluid and the discharge fluid to the desired ports in the sleeve and body.

14. The method of claim 11 further comprising seal elements disposed between the sleeve and the body in a radial direction to fluidically seal the first discharge port from the first inlet port and to fluidically seal the first operational port from the third operational port.

15. The method of claim 10 wherein the valve is designed to handle operational fluid with a pressure greater than about 150 psi.

16. The method of claim 15 wherein the valve is designed to handle operational fluid with a pressure greater than about 175 psi.

17. The method of claim 10 wherein the sleeve is made of a polytetrafluoroethylene (PTFE) containing material.

* * * * *